US011999039B2

(12) United States Patent
Cheylus et al.

(10) Patent No.: US 11,999,039 B2
(45) Date of Patent: Jun. 4, 2024

(54) ROTARY-PERCUSSIVE HYDRAULIC PERFORATOR PROVIDED WITH A STOP PISTON AND A BRAKING CHAMBER

(71) Applicant: MONTABERT, Saint-Priest (FR)

(72) Inventors: François-Xavier Cheylus, Lyons (FR); Michel Escolle, Nievroz (FR)

(73) Assignee: MONTABERT, Saint-Priest (FR)

( * ) Notice: Subject to any disclaimer, the term of this patent is extended or adjusted under 35 U.S.C. 154(b) by 154 days.

(21) Appl. No.: 17/682,909

(22) Filed: Feb. 28, 2022

(65) Prior Publication Data

US 2022/0274242 A1 Sep. 1, 2022

(30) Foreign Application Priority Data

Mar. 1, 2021 (FR) ...................................... 21/01950

(51) Int. Cl.

*B25D 17/06* (2006.01)
*B25D 9/14* (2006.01)
*B25D 9/26* (2006.01)
*E21B 1/38* (2006.01)
*E21B 6/00* (2006.01)

(52) U.S. Cl.

CPC ............... *B25D 17/06* (2013.01); *B25D 9/26* (2013.01); *E21B 1/38* (2020.05); *E21B 6/00* (2013.01); *B25D 9/145* (2013.01); *B25D 2209/002* (2013.01); *B25D 2217/0023* (2013.01)

(58) Field of Classification Search

CPC .......... B25D 17/06; B25D 9/26; B25D 9/145; B25D 2217/0023; B25D 2250/131; B25D 17/02; B25D 2217/0019; E21B 1/38; E21B 6/00; E21B 6/04; B28D 1/146

See application file for complete search history.

(56) References Cited

U.S. PATENT DOCUMENTS 4,593,768 A * 6/1986 Eklof ..................... B25D 17/24 92/143
5,002,136 A * 3/1991 Barthomeuf ............. B25D 9/26 173/128

(Continued)

FOREIGN PATENT DOCUMENTS

FR 2761112 A1 9/1998
FR 2902684 A1 12/2007

(Continued)

*Primary Examiner* — Blake Michener
*Assistant Examiner* — Yanick A Akaragwe
(74) *Attorney, Agent, or Firm* — CANTOR COLBURN LLP

(57) ABSTRACT

The rotary-percussive hydraulic perforator includes a body; a shank; a striking piston configured to strike the shank and provided with a braking surface; a braking chamber configured to hydraulically brake the striking piston; a stop piston configured to apply a pushing force on the shank and provided with a bearing surface configured to abut against a stop surface provided on the body, so as to limit the stroke of displacement of the stop piston towards the shank. The rotary-percussive hydraulic perforator is configured such that the bearing surface and the stop surface are axially spaced apart by a predetermined spacing distance simultaneously when (i) the shank bears on the stop piston and is in contact with the striking piston, and (ii) the braking surface is located at an inlet edge of the braking chamber.

13 Claims, 4 Drawing Sheets

(56) References Cited

U.S. PATENT DOCUMENTS

| | | | | |
|---|---|---|---|---|
| 5,117,921 | A | 6/1992 | Bartels et al. | |
| 5,479,996 | A * | 1/1996 | Jonsson | E21B 44/06<br>175/135 |
| 6,273,199 | B1 | 8/2001 | Kiikka et al. | |
| 8,151,900 | B2 | 4/2012 | Piras | |
| 11,383,368 | B2 * | 7/2022 | Comarmond | B25D 9/12 |
| 2013/0037293 | A1 * | 2/2013 | Johansson | E21B 1/38<br>173/210 |

FOREIGN PATENT DOCUMENTS

| | | | |
|---|---|---|---|
| WO | 2010082871 | A1 | 7/2010 |
| WO | 2014070072 | A1 | 5/2014 |

* cited by examiner

ROTARY-PERCUSSIVE HYDRAULIC PERFORATOR PROVIDED WITH A STOP PISTON AND A BRAKING CHAMBER

CROSS REFERENCE TO RELATED APPLICATIONS

This application claims priority under 35 U.S.C. § 119 to the following French Patent Application No. 21/01950, filed on Mar. 1, 2021, the entire contents of which are incorporated herein by reference thereto.

TECHNICAL FIELD

The present invention relates to a rotary-percussive hydraulic perforator used more specifically on a drilling rig.

BACKGROUND

A drilling rig comprises, in a known manner, a rotary-percussive hydraulic perforator slidably mounted on a slide and driving one or several drill bar(s), the last one of these drill bars carrying a tool called bit which is in contact with the rock. The purpose of such a perforator is generally to drill more or less deep holes in order to be able to place explosive loads therein. The perforator is therefore the main element of a drilling rig which, on the one hand, gives the bit rotation and percussion through the drill bars so as to penetrate the rock, and on the other hand, provides an injection fluid so as to extract the debris from the drilled hole.

A rotary-percussive hydraulic perforator more particularly comprises on the one hand a striking system which is driven by one or several hydraulic fluid flow(s) coming from a main hydraulic supply circuit and which comprises a striking piston configured to strike, at each operating cycle of the perforator, a shank coupled to the drill bars, and on the other hand a rotation system provided with a hydraulic rotary motor and configured to rotate the shank and the drill bars.

In order to keep the bit bearing against the rock, a pushing force is generally applied by the slide on the rotary-percussive hydraulic perforator. Advantageously, the pushing force is generated by the slide mainly thanks to a drive cable or chain, primarily driven by a hydraulic cylinder or a hydraulic motor.

The aforementioned pushing force is transmitted from the rotary-percussive hydraulic perforator to the bit through the shank and the drill bars. More specifically, the pushing force is transmitted from the body of the perforator to the shank through a stop element incorporated into the body of the perforator. This stop element may be constituted, for powerful perforators, of a stop piston, at least one surface of which is hydraulically supplied so as to ensure a transmission of the pushing force by means of a fluid. The pushing force should also partially compensate for the recoil force of the perforator which is primarily caused by the striking pressure and the striking frequency of the striking piston and which increases with these parameters. Ultimately, the bit is pressed against the rock approximately only by the difference between the pushing force and the recoil force, which will be called the residual bearing force, as well as by the force exerted by the stop element on the shank.

The stability and the penetration speed performance of a rotary-percussive hydraulic perforator, when it is operating, depend in particular on this residual bearing force at the moment of the hit, guaranteeing the proper transmission of the hit wave from the striking piston to the rock.

The document WO2010/082871 discloses a rotary-percussive hydraulic perforator wherein, in the operating conditions of the striking system, the stop piston is positioned in an equilibrium position, in accordance with a desired striking stroke of the striking piston, through a hydraulic control chamber delimited by the striking piston and the body of the perforator and permanently connected to a high-pressure fluid supply conduit, the hydraulic control chamber being configured, on the one hand, to urge the stop piston forwards and, on the other hand, to be connected to a low-pressure fluid return conduit when the rear face of the stop piston is located at a predetermined distance from the rear wall of the cavity receiving the stop piston.

The configuration of the stop piston and of the body described in document WO2010/082871 allows ensuring a substantially stable positioning of the stop piston during the operation of the striking system, around a predetermined optimum work position.

However, when the stop piston is in an equilibrium position, determined hydraulically or mechanically, it is likely, in some operating conditions of the rotary-percussive hydraulic perforator, not to keep the bit in contact with the rock. In this specific case, each hit of the striking piston is transmitted to the shank, to the drill bars and to the bit without the slightest bearing of the latter on the rock, which generates destructive effects on these parts as well as on the striking line of the perforator. This striking phase may for example be called the “poorly supported strike” phase or the “idle strike” phase, resulting from a pushing force that is too small relative to a given striking pressure.

To overcome these inconveniences, it is known to limit the striking pressure actuating the striking piston, and therefore the impact speed of the striking piston, when the perforator operates in a poorly supported striking phase. The detection, amongst others, of a reduction in the pushing force or an increase in the flow rate at which the cylinder is supplied or the advance motor of the slide makes it possible to transmit a control signal to control members external to the perforator in such a way that they limit the striking pressure of the striking piston.

This limitation function, aiming at limiting the striking pressure of the striking piston, is not always adjusted to the best on the perforators and it is sometimes disconnected by the users. Moreover, for economic reasons, this limitation function is sometimes not implemented on the perforators.

To limit the risks of deterioration of the striking line of a rotary-percussive hydraulic perforator in the event of idle strike, it is also known to equip the body of the latter with an annular braking chamber which is provided for example in the continuation of a control chamber (permanently connected to a high-pressure fluid supply conduit and participating in the control of the striking and return strokes of the striking piston) and which is configured to be fluidly isolated from the control chamber (through a braking surface provided on the striking piston) when the striking piston exceeds a desired maximum stroke in order to rapidly slow down the speed of impact of the striking piston on the shank, and therefore to limit the energy transmitted to the shank, and also in order to limit the impact speed of the striking piston on a piston stop surface provided on the body of the rotary-percussive hydraulic perforator and configured to limit the striking stroke of the striking piston.

The body of the perforator is also provided with a front stop surface whose function is to limit, axially and towards the front of the perforator, the stroke of the shank. Depending on the adopted technological choices, the position of the shank on the front stop surface may either allow a reduced speed of impact of the striking piston on the shank, for example when a withdrawal force is exerted on the perforator by the slide, the purpose of which is to unblock the bit when it is trapped in the rock, or prevent any contact between the shank and the striking piston.

According to such an embodiment of the rotary-percussive hydraulic perforator, the stop piston comprises a bearing surface which is suitable for abutting against a stop surface provided on the body, so as to limit the stroke of displacement of the stop piston towards the shank, and the rotary-percussive hydraulic perforator is configured such that the bearing surface and the stop surface are in contact with each other simultaneously when:

- the shank bears on the stop piston, generally through a stop ring, and is in contact with the striking piston, and
- the braking surface of the striking piston is located at an inlet edge of the braking chamber.

Thus, when the bearing surface provided on the stop piston and the stop surface provided on the body are in contact with each other, the position occupied by the stop piston usually corresponds to positioning the shank axially relative to the striking piston such that, when the striking piston comes into contact with the shank, the braking surface of the striking piston begins to penetrate the annular braking chamber and, consequently, to enter its braking phase. Such a position of the striking piston (at the precise moment when the striking piston isolates fluidly the braking chamber) corresponds to a maximum impact speed of the striking piston.

In this configuration of the stop piston, the precise position of the shank is nonetheless not determined since it depends in particular on the recoil force of the perforator and on the pushing force applied by the slide on the perforator (the shank being located between a bearing position in which it bears against the stop surface before a bearing position in which it bears against the stop piston). Thus, when the bearing surface provided on the stop piston and the stop surface provided on the body are in contact with each other, the speed of impact of the striking piston on the shank will be comprised, based on the residual bearing force, between the determined maximum impact speed and the determined minimum impact speed, but cannot be precisely defined.

In addition, the speed of impact between the striking piston and the shank may be higher than the maximum impact speed if the shank, thrust by the previous hit given by the striking piston, bounces off the front stop surface and encounters the striking piston again before its braking phase with a high recoil speed. If this speed of impact of the striking piston on the shank is too high while the bit is not in contact with the rock, premature ruptures will be in particular deplored by the user of the perforator on a possible stop ring interposed between stop piston and the shank, the front bearing surface, the stop piston, the striking piston, the piston stop surface, the shank, the drill bars and/or the bit (mainly at the threading connecting the drill bars to each other).

BRIEF SUMMARY

The present invention aims at overcoming these drawbacks.

Hence, the technical problem at the origin of the invention consists in providing a rotary-percussive hydraulic perforator which has a simple and economical structure, while having improved reliability and that without requiring the presence of additional external components associated or not with additional hydraulic circuits and parts.

To this end, the present invention concerns a rotary-percussive hydraulic perforator comprising:

- a body,
- a shank mounted in the body and intended to be coupled to at least one drill bar equipped with a tool,
- a striking piston slidably mounted inside the body according to a striking axis and configured to strike the shank, the striking piston including a braking surface which extends transversely to the striking axis,
- a braking chamber configured to hydraulically brake the striking piston when the striking piston exceeds a predetermined striking position, the braking chamber being configured to be partially closed by the braking surface of the striking piston when the striking piston exceeds the predetermined striking position,
- a stop piston which is tubular and which is slidably mounted inside the body along an axis of displacement substantially parallel to the striking axis, the stop piston being configured to apply a pushing force on the shank, the stop piston comprising a bearing surface configured to bear against a stop surface provided on the body, so as to limit the stroke of displacement of the stop piston towards the shank, characterized in that the rotary-percussive hydraulic perforator is configured such that the bearing surface and the stop surface are axially spaced apart from each other by a predetermined spacing distance simultaneously when:

- the shank bears on the stop piston and is in contact with the striking piston, and
- the braking surface of the striking piston is located at an inlet edge of the braking chamber.

In other words, the rotary-percussive hydraulic perforator is configured such that the braking surface is located in the braking chamber and is axially spaced from the inlet edge of the braking chamber by a predetermined spacing distance simultaneously when:

- the shank bears on the stop piston and is in contact with the striking piston, and
- the bearing surface bears against the stop surface.

In the present description, by "bearing on" it should be understood "bearing directly or indirectly on". As a result, according to the present invention, the shank may bear directly on the stop piston or bear indirectly on the stop piston, that is to say by means of an intermediate part, such as a stop ring, interposed between the shank and the stop piston.

The specific configuration of the rotary-percussive hydraulic perforator according to the present invention allows, when the pushing force exerted by the slide on the perforator is very small, if any, compared to the striking pressure, the stop piston to be able to position the shank in an axial position such that the striking piston will have penetrated into the braking chamber with a distance corresponding to the predetermined spacing distance before being able to strike the shank. Thus, the rotary-percussive hydraulic perforator according to the present invention guarantees that the impact between the shank and the striking piston is carried out at a reduced speed (comprised between the minimum impact speed and the maximum impact speed) when the residual bearing force is small, and therefore without generating damage to the constituent elements of the striking line of the perforator, and in particular to the shank, to the drill bar(s) and to the bit.

Consequently, the rotary-percussive hydraulic drill according to the present invention makes it possible to define an intermediate impact speed between the maximum impact speed and the minimum impact speed at which the striking piston will strike the shank, and thus definitely limiting the energy transmitted to the shank, to the drill bars and to the bit when the latter is not bearing on the rock to be drilled, and therefore to protect the shank, the drill bars, the bit and the entire striking line of the perforator. This protection function is integrated into the perforator, in its existing parts, without adding external control blocks or additional internal or external hydraulic circuits. Such a protection function makes it possible to no longer have to guarantee the safety of the perforator by external functionalities subject to hazards.

Advantageously, the intermediate impact speed may be calibrated taking into account the maximum impact speed of the striking piston, the braking force of the braking chamber and the configuration of the stop piston such that the impacts of the striking piston at the intermediate impact speed only generate low speed rebounds of the shank after its impact on the front bearing surface.

The rotary-percussive hydraulic perforator may further have one or more of the following features, considered alone or in combination.

According to an embodiment of the invention, the predetermined spacing distance, measured substantially parallel to the striking axis of the striking piston, is greater than or equal to 2 mm.

According to an embodiment of the invention, the braking surface extends in a plane substantially perpendicular to the striking axis.

According to an embodiment of the invention, the braking surface is annular.

According to an embodiment of the invention, the striking piston includes a braking shoulder which defines the braking surface.

According to an embodiment of the invention, the striking piston includes a first piston portion having a first diameter, and a second piston portion having a second diameter which is greater than the first diameter, the braking surface connecting the first and second piston portions.

According to an embodiment of the invention, the second piston portion is an annular piston collar.

According to an embodiment of the invention, the body includes a guide surface configured to axially guide the first piston portion during displacements of the striking piston along the striking axis.

According to an embodiment of the invention, an inner wall of the braking chamber and an outer surface of the second piston portion are configured to define a radial functional clearance when the second piston portion is disposed in the braking chamber.

According to an embodiment of the invention, the radial functional clearance is comprised between 10 and 120 μm.

According to an embodiment of the invention, the rotary-percussive hydraulic perforator further comprises a main hydraulic supply circuit configured to control an alternating sliding of the striking piston along the striking axis, the main hydraulic supply circuit including a high-pressure fluid supply conduit and a low-pressure fluid return conduit.

According to an embodiment of the invention, the body and the striking piston delimit at least partially a first control chamber permanently connected to the high-pressure fluid supply conduit and a second control chamber which is antagonist to the first control chamber, the rotary-percussive hydraulic perforator further including a control distributor configured to fluidly connect the second control chamber alternately to the high-pressure fluid supply conduit and to the low-pressure fluid return conduit so as to control striking and return strokes of the striking piston.

According to an embodiment of the invention, the braking chamber extends in the continuation of the first control chamber and in the direction of the shank.

According to an embodiment of the invention, the braking chamber is configured to be supplied with high-pressure fluid by the first control chamber when the braking surface of the striking piston is remote from the braking chamber.

According to an embodiment of the invention, the braking chamber is configured to be at least partially fluidly isolated from the first control chamber when the braking surface of the striking piston is located in the braking chamber.

According to an embodiment of the invention, the braking chamber includes a bottom surface which is located opposite the inlet edge. Advantageously, the braking surface is configured to abut against the bottom surface of the braking chamber so as to limit the striking stroke of the striking piston.

According to an embodiment of the invention, the main hydraulic supply circuit is also configured to control the sliding of the stop piston along the axis of displacement.

According to an embodiment of the invention, the body and the stop piston delimit a primary control chamber which is permanently connected to the high-pressure fluid supply conduit and which is configured to urge the stop piston towards the shank.

According to an embodiment of the invention, the body and the stop piston delimit a secondary control chamber which is permanently connected to the low-pressure fluid return conduit or to a dedicated drain line, the secondary control chamber being antagonist to the primary control chamber.

According to an embodiment of the invention, the secondary control chamber is configured to urge the stop piston opposite to the shank.

According to an embodiment of the invention, the main hydraulic supply circuit further includes a low-pressure accumulator connected to the low-pressure fluid return conduit.

According to an embodiment of the invention, the main hydraulic supply circuit further includes a high-pressure accumulator connected to the high-pressure fluid supply conduit.

According to an embodiment of the invention, at least one or each of the low-pressure and high-pressure accumulators is a membrane accumulator, such as a hydropneumatic accumulator, a piston accumulator, a bladder accumulator or any other type of accumulator.

According to another embodiment of the invention, the rotary-percussive hydraulic perforator includes a secondary hydraulic supply circuit configured to control a sliding of the stop piston along the axis of displacement.

According to still another embodiment of the invention, the rotary-percussive hydraulic perforator includes a control device configured to adjust the position of the stop piston according to different operating parameters of the rotary-percussive hydraulic perforator.

According to an embodiment of the invention, the stop piston is slidably mounted around the striking piston.

According to an embodiment of the invention, the stop piston is configured to position the shank in a predetermined equilibrium position with respect to the striking piston.

According to an embodiment of the invention, the bearing surface is inclined with respect to the axis of displacement.

According to an embodiment of the invention, the bearing surface is inclined with respect to the axis of displacement according to an angle of inclination comprised between 5 and 175°, and advantageously between 30 and 60°, and for example of about 45°.

According to an embodiment of the invention, the stop surface is inclined with respect to the axis of displacement according to an angle of inclination comprised between 5 and 175°, and advantageously between 30 and 60°, and for example of about 45°.

According to an embodiment of the invention, the bearing surface is inclined towards the rear of the stop piston.

According to another embodiment of the invention, the stop surface and the bearing surface extend substantially perpendicular to the axis of displacement, and therefore substantially perpendicular to the striking axis.

According to an embodiment of the invention, the stop surface is annular.

According to an embodiment of the invention, the bearing surface is annular.

According to an embodiment of the invention, the bearing surface and the stop surface are configured to be in contact with one another over only a portion of the bearing surface and of the stop surface.

According to an embodiment of the invention, the body includes a main body and an inner sleeve which is fastened in the main body and which extends around the stop piston, the inner sleeve including the stop surface.

According to another embodiment of the invention, the stop surface is provided on the main body.

According to an embodiment of the invention, the rotary-percussive hydraulic perforator further includes a stop ring which is axially disposed between the shank and the stop piston and which is configured to apply the pushing force on the shank.

According to an embodiment of the invention, the stop ring and the stop piston extend coaxially.

According to an embodiment of the invention, the shank extends longitudinally along the striking axis.

According to an embodiment of the invention, the stop piston includes an annular collar including the bearing surface.

According to an embodiment of the invention, the rotary-percussive hydraulic perforator includes a front stop surface which is fixed relative to the body, the front stop surface being annular and extending around the shank, the shank being configured to abut against the front stop surface so as to limit the stroke of displacement of the shank forwards. Advantageously, the shank includes an annular bearing collar which is provided on an outer surface of the shank and which includes a front bearing surface configured to abut against the front stop surface.

BRIEF DESCRIPTION OF THE FIGURES

The present invention will be better understood from the following description with reference to the appended figures, wherein identical reference numerals correspond to structurally and/or functionally identical or similar elements.

DETAILED DESCRIPTION

Figure 1:
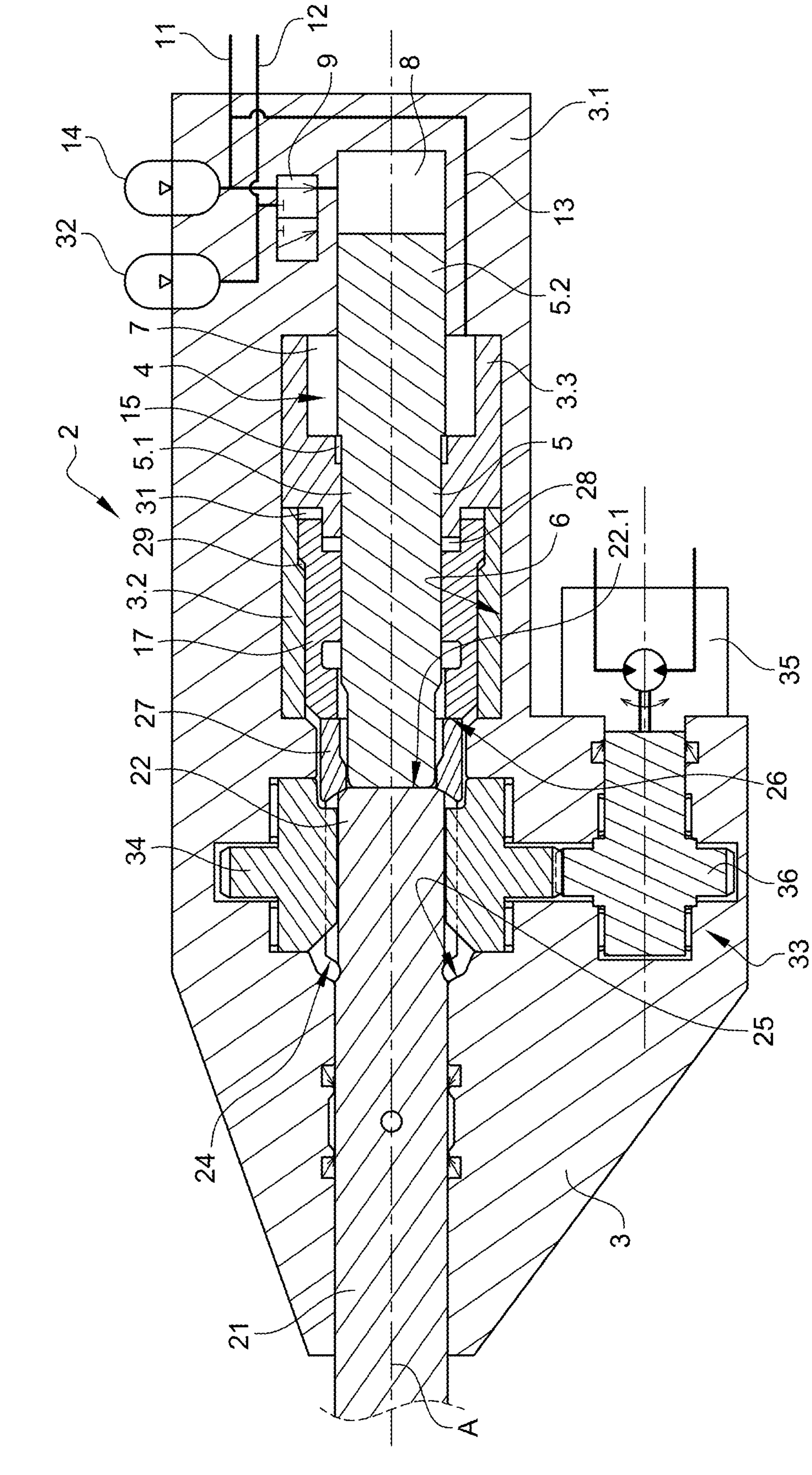
FIG. 1 is a longitudinal sectional view of a rotary-percussive hydraulic perforator according to a first embodiment of the invention, showing a striking piston, a stop piston and a shank in a first operating configuration.
Figure 2:
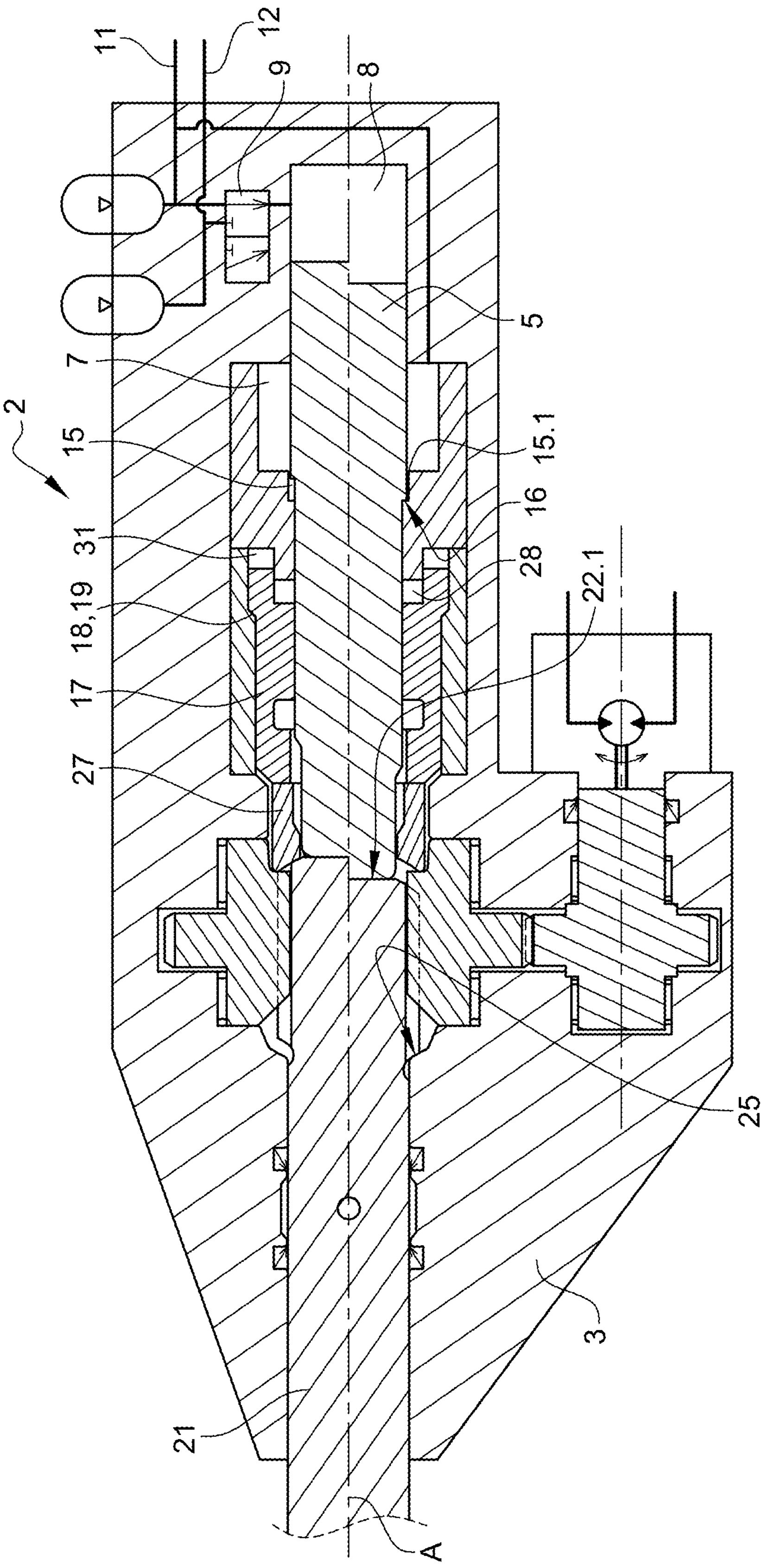
FIG. 2 is a longitudinal sectional view of the rotary-percussive hydraulic perforator of FIG. 1, showing the striking piston, the stop piston and the shank respectively in a second operating configuration and a third operating configuration.

FIGS. 1 and 2 represent a rotary-percussive hydraulic perforator 2 which is intended for drilling blast holes. The rotary-percussive hydraulic perforator 2 includes more particularly a body 3 which is configured to be slidably mounted on a slide (not represented in the Figures) provided on a carrier machinery. According to the embodiment represented in FIGS. 1 and 2, the body 3 includes a main body 3.1, and also an inner sleeve 3.2 and an additional inner sleeve 3.3 slidably or forcibly mounted in the main body 3.1.

The rotary-percussive hydraulic perforator 2 comprises a striking system 4 including a striking piston 5 slidably mounted alternately in a piston cylinder 6, which is defined by the body 3, according to a striking axis A. The striking piston 5 and the piston cylinder 6 delimit a first control chamber 7 which is annular, and a second control chamber 8 which has a cross-section larger than that of the first control chamber 7 and which is antagonist to the first control chamber 7.

The striking system 4 further comprises a control distributor 9 arranged so as to control an alternating movement of the striking piston 5 inside the piston cylinder 6 alternately along a striking stroke and a return stroke. The control distributor 9 is configured to set the second control chamber 8, alternately in connection with a high-pressure fluid supply conduit 11, such as a high-pressure incompressible fluid supply conduit, during the striking stroke of the striking piston 5, and with a low-pressure fluid return conduit 12, such as a low-pressure incompressible fluid return conduit, during the return stroke of the striking piston 5. The first control chamber 7 is advantageously permanently supplied with high-pressure fluid by a supply channel 13 connected to the high-pressure fluid supply conduit 11.

The high-pressure fluid supply conduit 11 and the low-pressure fluid return conduit 12 belong to a main hydraulic supply circuit with which the striking system 4 is provided. The main hydraulic supply circuit may advantageously include a high-pressure accumulator 14 connected to the high-pressure fluid supply conduit 11.

The striking system 4 also includes a braking chamber 15 configured to hydraulically brake the striking piston 5 when the striking piston 5 exceeds a predetermined striking position. Advantageously, the braking chamber 15 is annular and extends in the continuation of the first control chamber 7 and towards the front of the rotary-percussive hydraulic perforator 2. The braking chamber 15 includes an inlet edge 15.1 which is annular and a bottom surface 15.2 which is also annular and which is located opposite the inlet edge 15.1.

The braking chamber 15 is more particularly configured to:

- be partially closed by a braking surface 16 provided on the striking piston 5, and therefore to be partially fluidly isolated from the first control chamber 7, when the striking piston 5 exceeds the predetermined striking position, and
- be supplied with high-pressure fluid by the first control chamber 7 when the braking surface 16 of the striking piston 5 is away from the braking chamber 15.

Advantageously, the braking surface 16 is annular and extends transversely to the striking axis A and preferably in a plane substantially perpendicular to the striking axis A. Nonetheless, according to a variant of the invention, the braking surface 16 could have an angle comprised between 30 and 90° with respect to the striking axis A. The braking surface 16 is configured to abut against the bottom surface 15.2 of the braking chamber 15 of so as to limit the striking stroke of the striking piston 5.

According to the embodiment represented in FIGS. 1 and 2, the striking piston 5 includes a first piston portion 5.1 having a first diameter, a second piston portion 5.2 having a second diameter which is greater than the first diameter, and a braking shoulder which defines the braking surface 16 and which connects the first and second piston portions 5.1, 5.2. Advantageously, an inner wall of the braking chamber 15 and an outer surface of the second piston portion 5.2 are configured to define a radial functional clearance when the second piston portion 5.2 is disposed in the braking chamber 15. According to an embodiment of the invention, the radial functional clearance is comprised between 10 and 120 μm.

The rotary-percussive hydraulic perforator 2 also comprises a stop piston 17 which is tubular and which is slidably mounted inside the body 3 along an axis of displacement parallel to the striking axis A and preferably coinciding with the striking axis A. According to the embodiment represented in FIGS. 1 and 2, the stop piston 17 is slidably mounted around the striking piston 5, and extends coaxially to the striking piston 5.

The stop piston 17 includes a bearing surface 18 which is annular and which is configured to abut against a stop surface 19, also annular, provided on the body 3 and for example on the inner sleeve 3.2, so as to limit the stroke of displacement of the stop piston 17 towards the front of the rotary-percussive hydraulic perforator 2.

Figure 3:
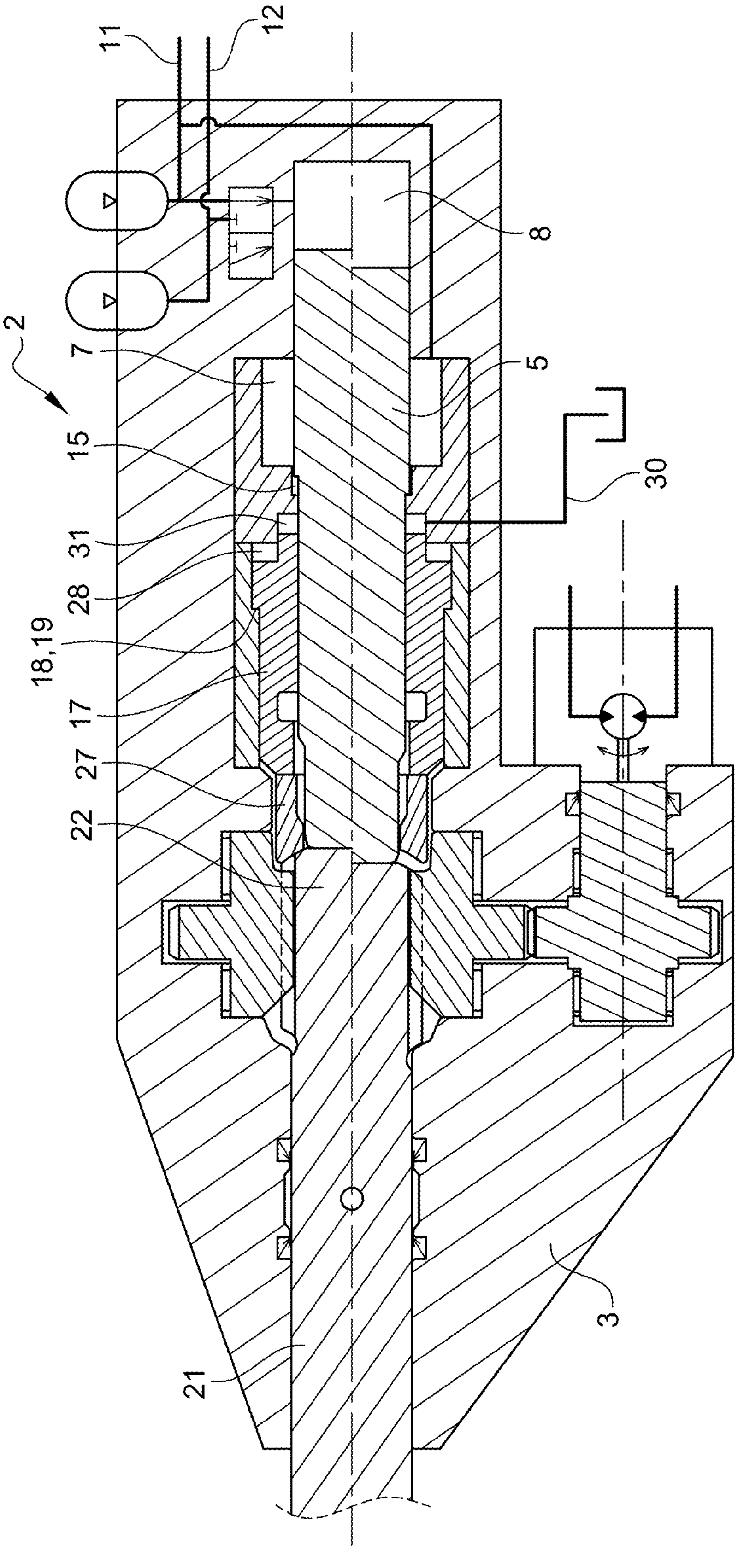
FIG. 3 is a longitudinal sectional view of a rotary-percussive hydraulic perforator according to a second embodiment of the invention.
Figure 4:
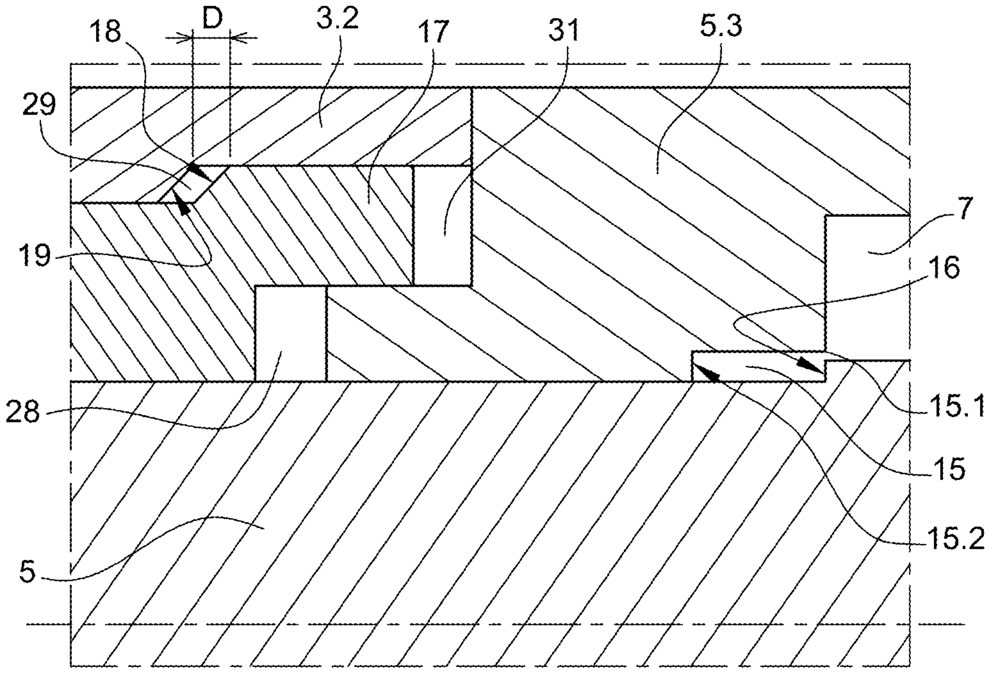
FIG. 4 is an enlarged scale view of a detail in FIG. 1.

According to the embodiment represented in FIGS. 1 and 2, the bearing surface 18 is inclined relative to the axis of displacement according to an angle of inclination comprised between 30 and 60°, and for example of about 45°, and the sop surface 19 is also inclined with respect to the axis of displacement according to an angle of inclination comprised between 30 and 60°, and for example of about 45°. Advantageously, each of the bearing and stop surfaces 18, 19 diverges in the direction of a rear end of the stop piston 17. Nonetheless, according to another embodiment of the invention represented in FIG. 3, each of the stop surface 19 and the bearing surface 18 could extend substantially perpendicular to the axis of displacement.

The rotary-percussive hydraulic perforator 2 further includes a shank 21 intended to be coupled, in a known manner, to at least one drill bar (not represented in the figures) equipped with a tool, also called bit. The shank 21 extends longitudinally along an axis of extension which advantageously coincides with the striking axis A, and includes a first end portion 22 facing the striking piston 5 and provided with an end face 22.1 against which the striking piston 5 is intended to hit during each operating cycle of the rotary-percussive hydraulic perforator 2, and a second end portion (not represented in the figures), opposite the first end portion 22, intended to be coupled to the at least one drill bar.

The shank 21 also includes a front bearing surface 24 configured to abut against a front stop surface 25, which is annular and which extends around the shank 21, so as to limit the stroke of displacement of the shank 21 forwards. The front bearing surface 24 may for example be annular, or be discontinuous if the female and male coupling splines provided on the shank 21 extend up the front bearing surface 24. The front stop surface 25 may be provided directly on the body 3 and in particular the main body 3.1, or may be provided on an annular stop ring which is disposed in the main body 3.1. Advantageously, the front bearing surface 24 is inclined with respect to the striking axis A and diverges in the direction of the striking piston 5.

The stop piston 17 more particularly includes a front face 26 which is facing the shank 21 and which is configured to apply a pushing force directly on the shank 21 or indirectly on the shank 21 through a stop ring 27 interposed axially between the shank 21 and the stop piston 17.

The operation of a stop piston is well known to those skilled in the art and is therefore not described in detail in this description. In addition, the hydraulic supply of a stop piston may be carried out in various ways well known to those skilled in the art. Different examples of hydraulic supply of the stop piston 17 are however described hereinafter.

According to the embodiment represented in FIGS. 1 and 2, the body 3 and the stop piston 17 delimit, with the striking piston 5, a primary control chamber 28 which may for example be permanently connected to the high-pressure fluid supply conduit 11 and which is configured to urge the stop piston 17 forwards, that is to say towards the shank 21.

The body 3 and the stop piston 17 delimit, with the striking piston 5, also a secondary control chamber 29 which is antagonist to the primary control chamber 28 and which may for example be connected to the low-pressure fluid return conduit 12 or to a dedicated drain line. Advantageously, the bearing surface 18 and the stop surface 19 partially delimit the secondary control chamber 29.

According to the embodiment represented in FIGS. 1 and 2, the body 3 and the stop piston 17 delimit an additional control chamber 31 which is antagonist to the secondary control chamber 29 and which is for example connected to a low-pressure accumulator 32 connected to the low-pressure fluid return conduit 12 and belonging to the main hydraulic supply circuit of the striking system 4. Each of the aforementioned low-pressure and high-pressure accumulators may be a membrane accumulator, such as a hydropneumatic accumulator, a piston accumulator, a bladder accumulator or any other type of accumulator. Nonetheless, according to the embodiment represented in FIG. 3, the additional control chamber 31 could be connected to an outer drain 30. According to another variant of the invention, the additional control chamber 31 could be connected directly to the low-pressure fluid return conduit 12, that is to say without the presence of a low-pressure accumulator.

According to the embodiment of the invention represented in FIGS. 1 and 2, the main hydraulic supply circuit is configured to also control the sliding of the stop piston 17 along the axis of displacement. However, according to a variant of the invention, the rotary-percussive hydraulic perforator 2 could include a secondary hydraulic supply circuit separate from the main hydraulic supply circuit and configured to control the sliding of the stop piston 17 along the axis of displacement.

The rotary-percussive hydraulic perforator 2 also comprises a rotational drive system 33 which is configured to drive the shank 21 in rotation about a rotational axis which is substantially coincident with the striking axis A. The rotational drive system 33 includes a coupling member 34, such as a coupling pinion, which is tubular and which is disposed around the shank 21. The coupling member 34 comprises male coupling splines and female coupling splines which are coupled in rotation respectively with female and male coupling splines provided on the shank 21.

Advantageously, the coupling member 34 includes outer peripheral gearing coupled in rotation with an output shaft of a drive motor 35, such as a hydraulic motor hydraulically supplied by an external hydraulic supply circuit, belonging to the rotational drive system 33. The rotational drive system 33 may for example include an intermediate pinion 36 which is coupled on the one hand to the output shaft of the drive motor 35 and on the other hand to the outer peripheral gearing of the coupling member 34.

When the rotary-percussive hydraulic perforator 2 is in operation, the shank 21 is rotated thanks to the drive motor 35, and the shank 21 receives on its end face 17 the cyclic hits of the striking piston 5, ensured by the striking system 4 supplied by the main hydraulic supply circuit. At the same time, the carrier machinery on which the rotary-percussive hydraulic perforator 2 is mounted applies a pushing force on the drill bar, via the body 3 and the shank 21. Inside the rotary-percussive hydraulic perforator 2, between the body 3 and the shank 21, this pushing force is transmitted through the stop piston 17 and the stop ring 27.

The rotary-percussive hydraulic perforator 2 is more particularly configured such that the bearing surface 18 and the stop surface 19 are axially spaced apart from each other by a predetermined spacing distance D simultaneously when:

- the shank 21 bears on the stop piston 17, via the stop ring 27, and is in contact with the striking piston 5, and
- the braking surface 16 of the striking piston 5 is located at the inlet edge 15.1 of the braking chamber 15, that is to say is located radially opposite the inlet edge 15.1.

Advantageously, the predetermined spacing distance D, measured substantially parallel to the striking axis A of the striking piston 5, is greater than or equal to 2 mm.

Such a configuration of the rotary-percussive hydraulic perforator 2 allows, when the pushing force exerted by the slide on the rotary-percussive hydraulic perforator 2 is too small, if any, compared to the striking pressure, the stop piston 17 of to be able to position the shank 21 in an axial position (corresponding to a position of the stop piston in which the bearing surface 18 bears against the stop surface 19) such that the striking piston 5 will have penetrated into the braking chamber 15 with a distance corresponding to the predetermined spacing distance D before being able to strike the shank 21. Thus, the rotary-percussive hydraulic perforator 2 according to the present invention guarantees that the impact between the shank 21 and the striking piston 5 is carried out at a reduced speed when the pushing force exerted by the slide on the rotary-percussive hydraulic perforator 2 is too low, if any, and therefore without generating damage to constituent elements of the striking line of the perforator, and in particular to the shank 21, to the drill bar(s) and to the bit.

Consequently, the rotary-percussive hydraulic perforator 2 according to the present invention makes it possible to define an intermediate impact speed of the striking piston comprised between a maximum impact speed of the striking piston 5 (which corresponds to a position of the striking piston 5 in which the braking surface 16 is located at the inlet edge 15) and a minimum impact speed of the striking piston 5 (which corresponds to a position of the striking piston 5 in which the braking surface 16 is located in contact with the bottom surface 15.2), and thus to definitely limit the energy transmitted to the shank 21, to the drill bars and to the bit when the latter is not resting on the rock de be drilled, and therefore to protect the shank 21, the drill bars, the bit and the entire striking line of the rotary-percussive hydraulic perforator 2.

Such a protection function is integrated in the rotary-percussive hydraulic perforator 2, without the addition of external control blocks or additional internal or external hydraulic circuits, and is therefore obtained without having to guarantee the safety of the perforator by external functionalities subject to hazards.

It goes without saying that the invention is not limited to the sole embodiments of this rotary-percussive hydraulic perforator, described hereinabove as examples, it encompasses on the contrary all variants thereof.

The invention claimed is:

1. A rotary-percussive hydraulic perforator comprising:

- a body;
- a shank mounted in the body and intended to be coupled to at least one drill bar equipped with a tool;
- a striking piston slidably mounted inside the body according to a striking axis and configured to strike the shank, the striking piston including a braking surface which extends transversely to the striking axis;
- a braking chamber configured to hydraulically brake the striking piston when the striking piston exceeds a predetermined striking position, the braking chamber being configured to be partially closed by the braking surface of the striking piston when the striking piston exceeds the predetermined striking position;
- a stop piston which is tubular and which is slidably mounted inside the body along an axis of displacement substantially parallel to the striking axis, the stop piston being configured to apply a pushing force on the shank, the stop piston comprising a bearing surface configured to abut against a stop surface provided on the body, so as to limit a stroke of displacement of the stop piston towards the shank;
- a main hydraulic supply circuit configured to control an alternating sliding of the striking piston according to the striking axis, the main hydraulic supply circuit including a high-pressure fluid supply conduit and a low-pressure fluid return conduit, wherein the body and the striking piston delimit at least partially a first control chamber permanently connected to the high-pressure fluid supply conduit and a second control chamber which is antagonistic to the first control chamber;
- a control distributor configured to fluidly connect the second control chamber alternately to the high-pressure fluid supply conduit and to the low-pressure fluid return conduit so as to control striking and return strokes of the striking piston;
- wherein the braking chamber extends from a bottom surface of the first control chamber and towards the shank; and
- wherein the rotary-percussive hydraulic perforator is configured such that the bearing surface and the stop surface are axially spaced apart from each other by a predetermined spacing distance simultaneously when:
  - the shank bears on the stop piston and is in contact with the striking piston, and
  - the braking surface of the striking piston is located at an inlet edge of the braking chamber.

2. The rotary-percussive hydraulic perforator according to claim 1, wherein the predetermined spacing distance, measured substantially parallel to the striking axis of the striking piston, is greater than or equal to 2 mm.

3. The rotary-percussive hydraulic perforator according to claim 2, wherein the braking surface extends in a plane substantially perpendicular to the striking axis.

4. The rotary-percussive hydraulic perforator according to claim 3, wherein the striking piston includes a first piston portion having a first diameter, and a second piston portion having a second diameter which is greater than the first diameter, the braking surface connecting the first and second piston portions.

5. The rotary-percussive hydraulic perforator according to claim 4, wherein an inner wall of the braking chamber and an outer surface of the second piston portion are configured to define a radial functional clearance when the second piston portion is disposed in the braking chamber.

6. The rotary-percussive hydraulic perforator according to claim 1, wherein the braking surface extends in a plane substantially perpendicular to the striking axis.

7. The rotary-percussive hydraulic perforator according to claim 1, wherein the striking piston includes a first piston portion having a first diameter, and a second piston portion having a second diameter which is greater than the first diameter, the braking surface connecting the first and second piston portions.

8. The rotary-percussive hydraulic perforator according to claim 7, wherein an inner wall of the braking chamber and an outer surface of the second piston portion are configured to define a radial functional clearance when the second piston portion is disposed in the braking chamber.

9. The rotary-percussive hydraulic perforator according to claim 1, wherein the main hydraulic supply circuit is also configured to control sliding of the stop piston according to the axis of displacement.

10. The rotary-percussive hydraulic perforator according to claim 1, wherein the bearing surface is inclined with respect to the axis of displacement.

11. The rotary-percussive hydraulic perforator according to claim 10, wherein the body includes a main body and an inner sleeve which is fastened in the main body and which extends around the stop piston, the inner sleeve including the stop surface.

12. The rotary-percussive hydraulic perforator according to claim 1, wherein the body includes a main body and an inner sleeve which is fastened in the main body and which extends around the stop piston, the inner sleeve including the stop surface.

13. The rotary-percussive hydraulic perforator according to claim 1, which further includes a stop ring which is axially disposed between the shank and the stop piston and which is configured to apply the pushing force on the shank.

* * * * *